Figure 1:
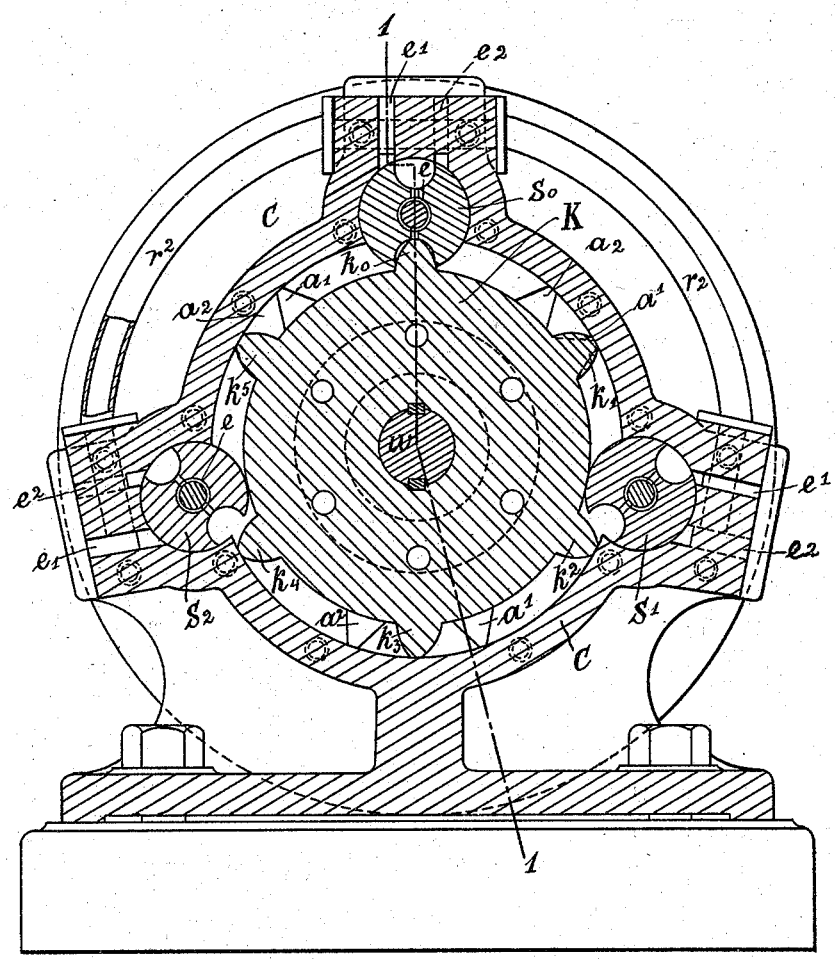

(No Model.) 6 Sheets—Sheet 1.

A. A. KRYSZAT.
ROTARY ENGINE.

No. 562,405. Patented June 23, 1896.

Witnesses
H. van Oldenneel
E. K. Sturtevant

Inventor
Albert August Kryszat
by
Attorney

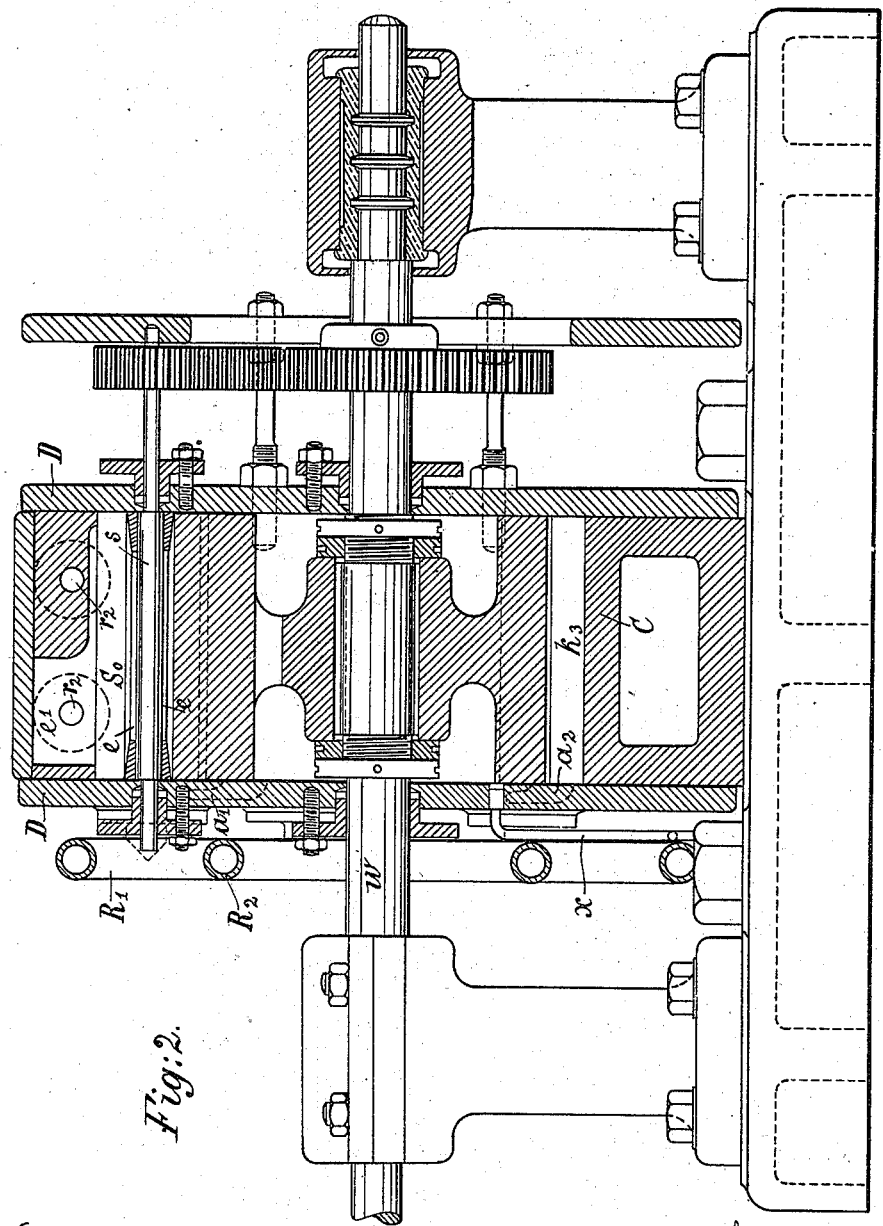

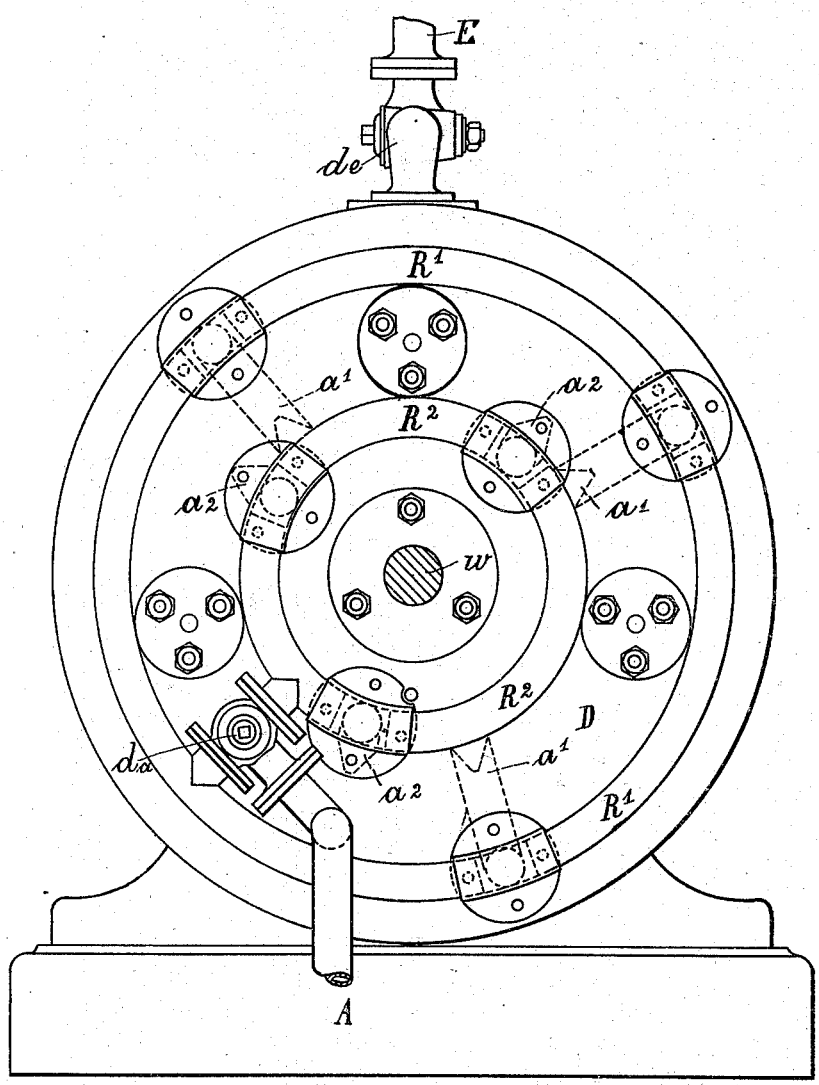

(No Model.) 6 Sheets—Sheet 4.
A. A. KRYSZAT.
ROTARY ENGINE.
No. 562,405. Patented June 23, 1896.
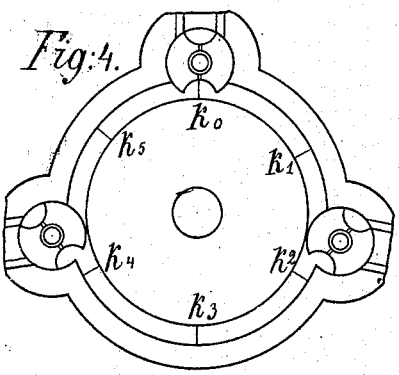
Fig: 4.
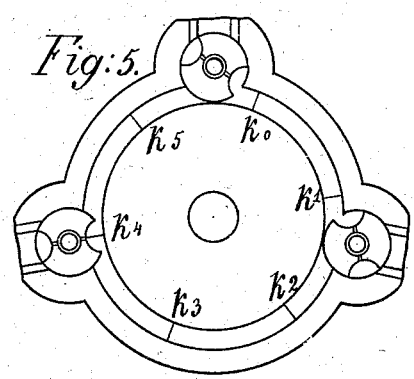
Fig: 5.
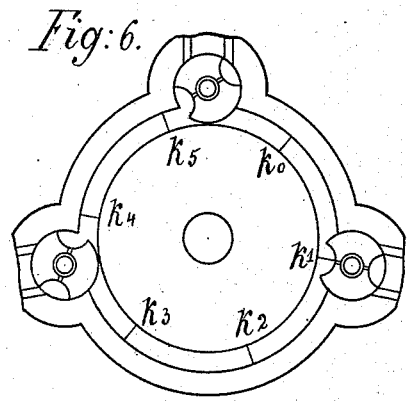
Fig: 6.
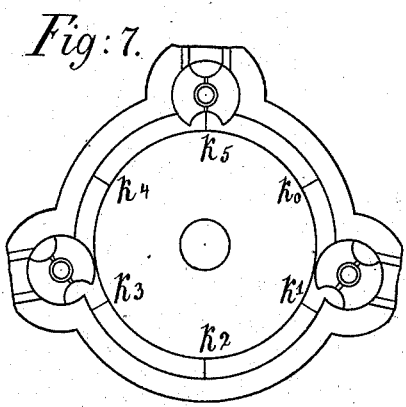
Fig: 7.
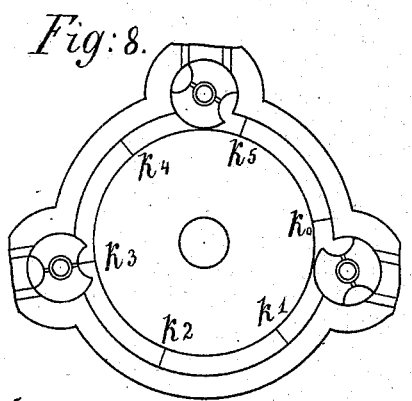
Fig: 8.
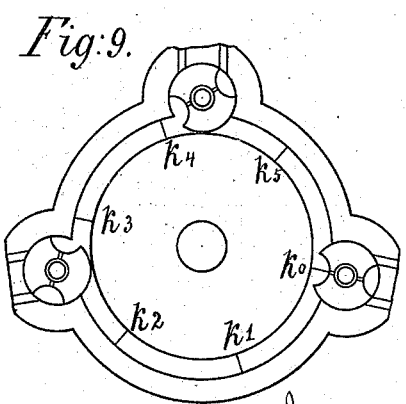
Fig: 9.
Witnesses
H. van Oldenneel
E. K. Sturtevant
Inventor
Albert August Kryszat
by
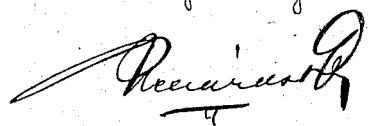
Attorney

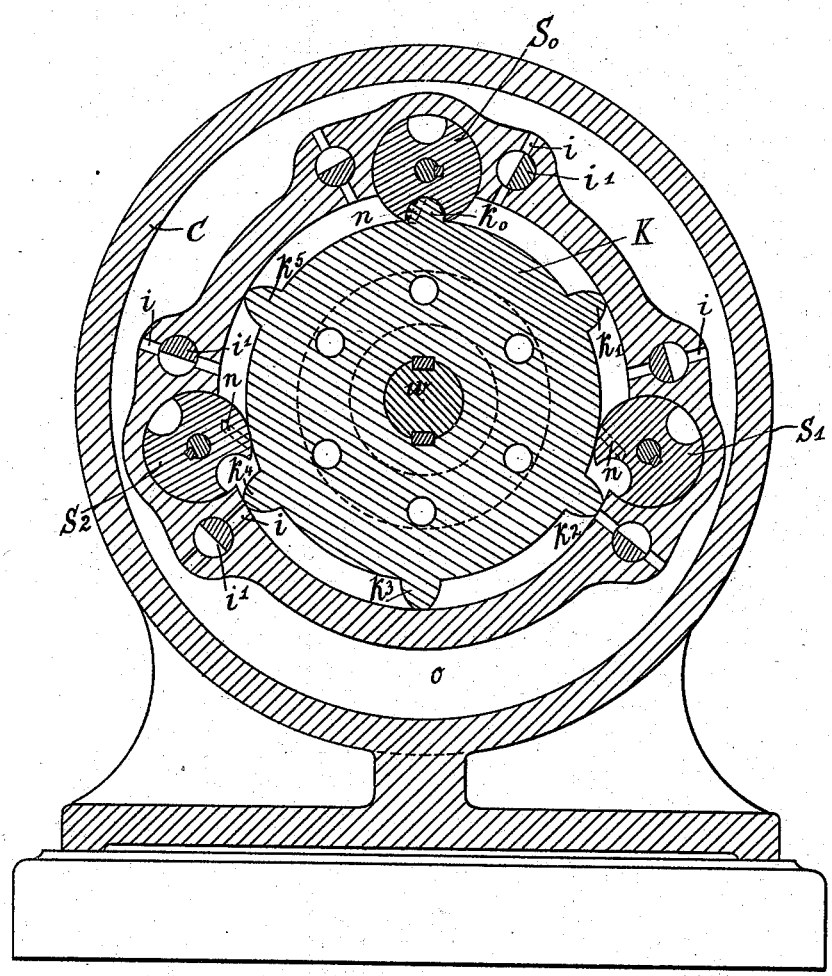

(No Model.) 6 Sheets—Sheet 6.
A. A. KRYSZAT.
ROTARY ENGINE.
No. 562,405. Patented June 23, 1896.
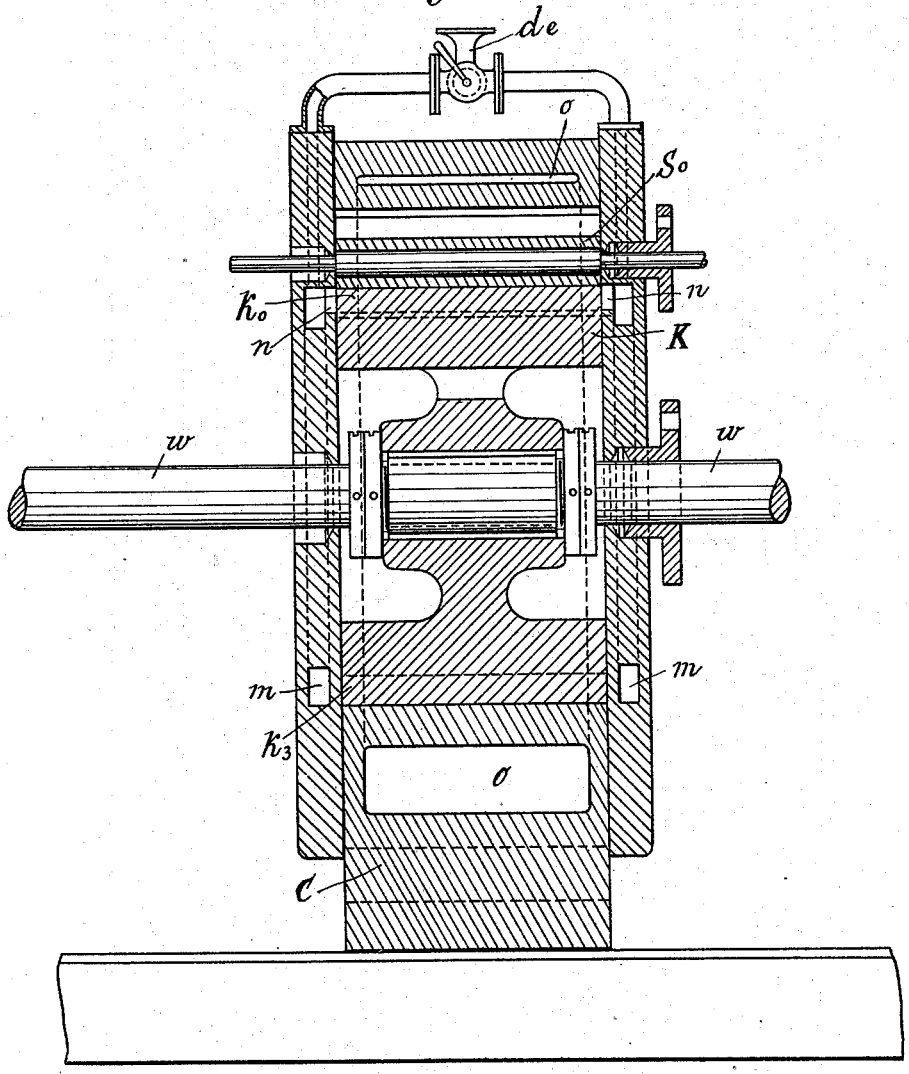
Fig:11.
Witnesses
H. van Oldenneel
E. N. Sturtevant
Inventor
Albert August Kryszat
by
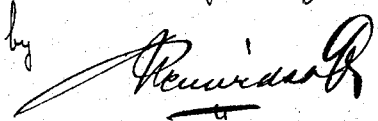
Attorneys

UNITED STATES PATENT OFFICE.

ALBERT AUGUST KRYSZAT, OF ASCHERSLEBEN, GERMANY.

ROTARY ENGINE.

SPECIFICATION forming part of Letters Patent No. 562,405, dated June 23, 1896.

Application filed May 3, 1895. Serial No. 548,003. (No model.)

*To all whom it may concern:*

Be it known that I, ALBERT AUGUST KRYSZAT, engineer, a subject of the Emperor of Germany, and a resident of Aschersleben, in the Empire of Germany, have invented new and useful Improvements in Rotary Engines, of which the following is a full, clear, and exact description.

This invention relates to a rotary engine driven by steam, gas, or other fluid and provided with a number of inlet and outlet ports situated between teeth-like longitudinal rails or ridges on the periphery of the piston and rotary valves, acting also as abutments, the steam or other actuating fluid being thus utilized in such manner that, at each revolution, the piston works partly at full pressure and partly with expansion. Consequently the working is not only very uniform, but the consumption of steam or other fluid is most economical. The steam-inlet ports (presuming that steam is to be the actuating medium) are in direct communication with the chests of said rotary valves. The engine is started, stopped, or reversed by correspondingly turning a three-way cock in connection with the chest of one of the rotary valves. Outlet-ports, corresponding in number to the inlet-ports, are provided in one of the cylinder-walls, such outlet-ports communicating with two annular pipes arranged on the outer end plate of the cylinder. These two pipes are connected by means of a three-way cock and fulfil the functions of exhaust-pipes, the one as exhaust for the forward working and the other for the backward working of the engine. One, therefore, is always cut off while the other is acting as exhaust. The three-way cock for reversing the engine is connected by any suitable means with the three-way cock through which the steam is admitted. Consequently, on turning one cock the other is simultaneously turned accordingly.

Referring to the accompanying drawings, Figure 1 is a cross-vertical section of the motor; Fig. 2, a longitudinal section on line 1 1, Fig. 1. Fig. 3 is a back view. Figs. 4 to 9 are diagrams showing the relative positions of the rotary valves and teeth or ridges of the piston during rotation. Figs. 10 and 11 illustrate in cross and longitudinal sections, respectively, a modified construction of the engine.

The motor consists of a cylinder C, in which rotates the piston K, keyed onto the shaft $w$, the whole being inclosed by the end plate D. Teeth $k^0$ to $k^5$, on which the steam acts, are arranged at equal distance apart on the periphery of the piston and parallel to the shaft $w$. The rotary valves $S^0 S' S^2$ are mounted in the wall of the cylinder, which is suitably strengthened and enlarged at such parts. These valves serve at the same time as abutments and are made of cylindrical cast bodies provided with two longitudinal grooves or channels of suitable cross-sections, an exact engagement of the teeth and valves thus resulting. These rotary valves are driven from without the cylinder by cog-wheels mounted on their shafts, and engaging with a cog-wheel keyed on the main shaft $w$. The circumferential velocity of the piston to that of the rotary valves, in the example shown in the drawings, is as one to three. This relation of the piston to the valves is determined by the number of valves and teeth employed. Longitudinal slots connect the grooves with the space inside the valves and serve as steam-inlet ports.

The steam is admitted to the rotary slides in the following manner: Ports $e' e^2$, of the form shown in Fig. 2 and arranged opposite each other, are provided in the enlarged parts of the cylinder-wall. The valve-chests are so connected by pipes $r' r^2$, common to all, that the pipes $r^2$ communicate Figs. 1 and 2, with the valve-ports $e' e' e'$ and $r'$ with the ports $e^2 e^2 e^2$. The three-way cock $de$, Fig. 3, consequently admits the steam into the ports $e' e' e'$ or, after being turned the other way, into the ports $e^2 e^2 e^2$. Seeing that the three-way cock $de$ is also connected by lever or other suitable means (not shown in the drawings) to a cock $da$, the movements of the former are participated in by the latter and thus the inner exhaust-pipe $R^2$ and the outer exhaust-pipe $R'$ are brought into or out of connection accordingly. The object of such arrangement is to render it possible to reverse the engine at will by simply turning cock $d$ For engines which always work in one direction, each valve-chest is provided wi only one port $e$, which is connected with passages $e$ of the other two valve-chests by pipe $r$. The three-way cock is then substituted by an ordinary valve, and one of the exhaust-pipes $R'$ or $R^2$ is dispensed with.

The motor shown in the drawings is arranged for working in both directions and operates in the following manner: The three-way cock $de$ is shown in such a position that steam is admitted into the ports $e'\ e'\ e'$—viz., so that the piston rotates from left to right. As shown in Fig. 1, the tooth or ridge $k^0$ is just about to be acted on by the steam entering through the port $e'$. The tooth $k^2$ then works with full pressure and its valve $S'$ is just about to close the inlet-port $e'$, while the tooth $k^5$, whose valve $S^2$ has already cut off the steam entering at its port $e'$, works under expansion.

In arranging or adjusting the three-way cock $de$ for the forward working of the engine—i. e., for admitting the steam through ports $e'$, the exhaust-pipe $R^2$ is at the same time cut out and the exhaust-pipe $R'$ brought into communication with passages $a'$. The exhaust-steam therefore can thus pass off. Immediately the valve $S^0$ closes the port $e'$ the tooth $k^0$ commences its period of working under the pressure of expansion, such period continuing until said tooth reaches the outlet-passage $a'$, through which the exhaust-steam then escapes.

Figs. 4 to 9 show the relative positions of the teeth $k^0\ k'$, &c., to the rotary valves $S^0\ S'\ S^2$ during a complete revolution of the piston.

In Fig. 4, $K^2$ is in the position just before the steam-inlet port is closed and when the period of expansion commences. At $k^0$ the steam is just commencing to enter. Fig. 5: The steam is just being cut off at $k^0$ and the period of expansion commencing. At $k^4$ steam is beginning to enter while $k^2$ is working with expansion. Fig. 6: The steam is about to be cut off at $k^4$ when the period of expansion commences. At $k'$ the steam commences to be admitted while $k^0$ is in the expansion period. Fig. 7: The steam is about to be cut off at $k'$ when the period of expansion commences. At $k^5$ steam commences to enter while $k^4$ is in the expansion period. Fig. 8: The steam is about to be cut off at $k^5$ when the period of expansion commences. At $k^3$ steam is about to be admitted while $k'$ is working with expansion. Fig. 9: The steam is about to be cut off at $k^3$ when the period of expansion commences. At $k^0$ the steam commences to be admitted while $k^5$ is working with expansion.

When the piston is rotating in opposite direction, the several relative positions of the teeth and valves are reversed in exactly the same order as above.

On turning the three-way cocks $de$ and $da$ or reversing the direction of the piston, the steam passes through the inlet and outlet passages without operating the motor, when the cocks are only half open. On turning these cocks to the full extent, however, the ports $e'\ e'\ e'$ and $a'\ a'\ a'$ are closed and $e^2\ e^2\ e^2$ as well as $a^2\ a^2\ a^2$ opened. The steam now passes from $e^2$ to the piston still rotating in the opposite direction by virtue of inertia, acts as a brake on same, and finally causes it to change its direction of rotation. The water resulting from the condensed steam in the piston is let off by means of a pipe $x$, arranged on the side of the engine, Fig. 2.

Figs. 10 and 11 show a modified construction of engine, the inlet and outlet of the steam being regulated by separate or independent valves. Both end plates are provided with annular passages $m$, Fig. 11, through which the live steam is admitted, suitably-formed ports $n$ establishing the communication with the cylinder. The number of ports $n$ corresponds with the number of rotary valves $S^0\ S'$, &c. The cylinder has double walls, the exhaust-steam passing through ports $i$ into the space $o$, formed between said walls. The valves $i'$ open or close the communication of the cylinder with the space $o$. The outlet-ports $i$ to the right of the rotary valves $S^0\ S'$, &c., are closed, and those to the left open, when the piston rotates from left to right. When rotating in the other direction, however, the ports to the right are open and those to the left closed. This engine is reversed by means of the three-way cock $de$ through which the steam is admitted to the cylinder, either through the left or right end plate or cover of the cylinder.

The steam-inlet ports $n$ of both end plates are arranged in such manner that the opening of same by the piston-ridges and rotary valves is effected in exactly the same manner, whether the engine is running in the forward or backward direction. The advantage offered by such modified construction is that a very effective steam-jacket is obtained and the regulation of the engine or operation of the rotary valves is simplified.

It will be evident that any desired number of piston-teeth and rotary valves may be used, according to the size of the motor, the power to be developed, and the ratio of expansion of the steam or other fluid. It follows, therefore, that the greater the dimensions of the motor, by arranging a larger number of rotary valves and teeth or ridges on the piston a considerably more favorable result is attained than can be reached with smaller engines of this class. In order to effect a uniform working and an economical consumption of steam or other fluid employed, it is absolutely necessary either to arrange the rotary valves at unequal distances apart, or, when such valves are at equal distances apart, to provide an unequal or different number of valves and teeth or ridges on the piston. By thus arranging the valves a further advantage is secured—viz., that on opening the three-way cock $de$ and $da$ the engine starts immediately, no matter what the position of the piston is, because one of the valves is always in position to directly admit the steam.

Having now particularly described and ascertained the nature of this invention and in what manner the same is to be performed, I declare that what I claim is—

1. In combination, in a rotary engine, the casing, a rotary piston having teeth or projections and a plurality of rotary abutments having recesses for the teeth, said abutments being of an uneven number or spaced at unequal distances apart acting as controlling-valves and the abutments and teeth being arranged relatively to each other so that the steam will be acting at full pressure against one tooth of the piston while the steam will be acting expansively on the other tooth, said steam being then cut off by the corresponding abutment, the said casing having an inlet-port for each abutment which is controlled thereby.

2. In combination, the cylinder, the piston, the inlet-ports $e'$ $e^2$ the rotary abutment-valve controlling said ports and forming the inlet-valve, the exhaust-ports $a'$ and $a^2$ on opposite sides of the abutment-valve and means for opening and closing the ports $e'$ $a'$ and $e^2$ $a^2$, said abutment having opposite recesses with the port extending diametrically through the abutment and the ports $e'$ $e^2$ being arranged on each side of the port of the abutment substantially as described.

In witness whereof I have hereunto signed my name in the presence of two subscribing witnesses.

ALBERT AUGUST KRYSZAT.

Witnesses:
ARTHUR BAERMANN,
ALFRED MEISTER.